Patented Apr. 16, 1946

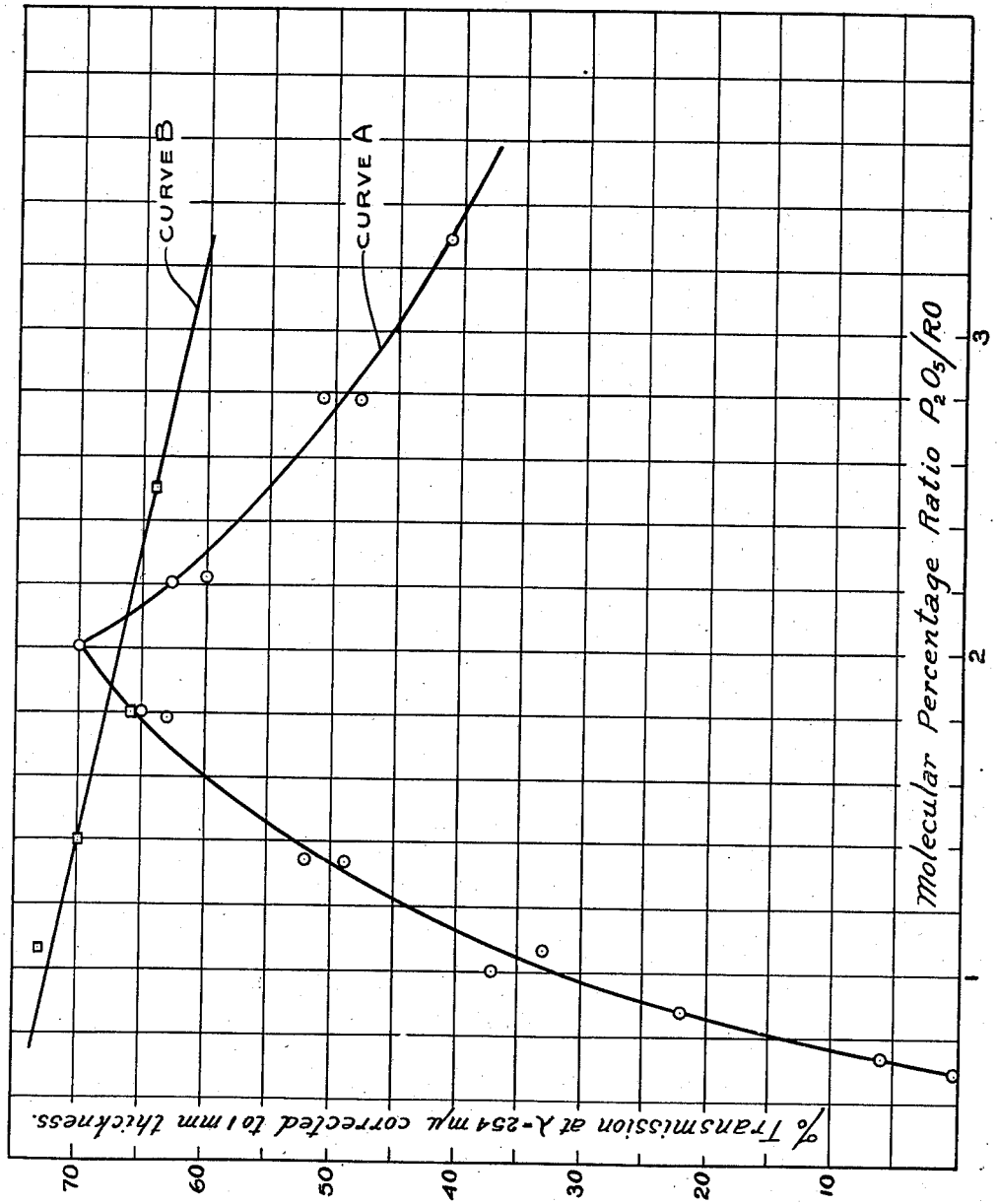

2,398,530

UNITED STATES PATENT OFFICE 2,398,530

ULTRAVIOLET TRANSMITTING GLASS

Joseph G. Hooley, Corning, N. Y., assignor to Corning Glass Works, Corning, N. Y., a corporation of New York Application February 25, 1941, Serial No. 380,534

8 Claims. (Cl. 106—47)

This invention relates to glasses which transmit ultra-violet radiations and particularly to phosphate glasses which absorb the visible while transmitting the ultra-violet. By the term "phosphate glasses" is meant those glasses in which the predominating acidic constituent is phosphoric oxide as compared to silicate glasses in which the predominating acidic constituent is silica. Glasses which absorb the visible but transmit ultra-violet, such as those which contain a substantial amount of cobalt oxide, are for practical purposes designated black glasses, even though they do transmit slightly at each end of the visible spectrum and appear dense purple by transmitted light.

The primary object of this invention is to improve the ultra-violet transmission of black phosphate glasses.

Another object is to improve the stability toward devitrification of black phosphate glasses.

Another object is to increase their stability in water and acid.

A further object is to produce black phosphate glass tubing.

Still another object is to produce a black phosphate glass having a transmission of more than 50% at wave length 254 m$\mu$ in one millimeter thickness.

Another object is to produce a black phosphate glass of high ultra-violet transmission which will not devitrify when drawn into tubing.

To these and other ends the invention comprises a black phosphate glass containing cobalt oxide or cobalt and nickel oxides and at least one second group oxide, the ratio between the molecular percentages of phosphoric oxide and the total of second group oxides being between 1.3 and 2.8. Such a glass when melted reducingly from materials of sufficiently low iron content and in a thickness of one millimeter has a transmission greater than about 50% for ultra-violet radiations of wave length 254 m$\mu$.

I have discovered that in phosphate glasses containing cobalt and nickel there is an important relationship between their transmissions at 254 m$\mu$ and their molecular percentage ratios $P_2O_5/RO$, where RO is the total of second group oxides. In general, as the ratio is increased the transmission rises to a maximum and thereafter diminishes with further increase in the ratio. The molecular percentage is determined by dividing the weight percentage of the individual oxides of the glass by their respective molecular weights. Prior compositions have almost without exception been expressed in terms of per cent by weight and the above mentioned relationship leading to improved transmissions has heretofore been entirely ignored.

In the accompanying drawing this relationship is shown for black phosphate glasses containing about 2% of cobalt oxide and 1% of nickel oxide (curve A), as compared with the same glasses free from cobalt and nickel (curve B). The transmissions represented by the various points of the curves were measured from pressed glass samples and were corrected to a thickness of one millimeter. Polished samples would have given in each instance a somewhat higher transmission. The glasses of curve A were made from the purest materials obtainable. Those of curve B were slightly less pure. All batches were melted reducingly by the inclusion of 1% by weight of sugar therein. The slight difference in purity between the glasses of the two curves accounts for the fact that they cross each other as shown, and no significance is to be attached to the apparent improvement in transmission of the black glass over the clear glass at ratio 2. The true difference between the transmissions at this point for glasses of the same purity would amount to about 5%, the glass of curve A being less than that of curve B by about this amount. The molecular percentage ratio $P_2O_5/RO$ was increased or diminished by employing second group oxides of higher or lower molecular weights and in some instances also by lowering or raising the weight percentage of $P_2O_5$. Preferably the weight percentage of $P_2O_5$ should not be greater than about 75%. For obtaining the higher molecular percentage ratios of $P_2O_5$ to RO the use of the alkaline earth oxides is preferable.

It will be observed that with the clear glasses of curve B the transmissions, although generally higher than those of curve A, decrease linearly as the ratio is increased. On the other hand, the transmissions of the black glasses of curve A rise from substantially zero for a ratio of .7 to a maximum of about 70% for a ratio of about 2.0 and thereafter diminish on further increase of the ratio. Moreover, between the ratios of 1.3 and 2.8 the transmissions of the black glasses exceed about 50% in a thickness of one millimeter. For a ratio of 1, as for example with glasses composed of monocalcium phosphate, the transmission of the black glass is only slightly above 30%. Insofar as I am aware, black phosphate glasses having a molecular percentage ratio $P_2O_5/RO$ greater than one have never before been produced nor proposed and the improved transmission of such glasses having higher ratios has been entirely unrecognized.

I have further found that phosphate glasses in which the ratio is 1 are unsuitable for the production of tubing because they divitrify during the multiple gathering and reheating which are necessary for this purpose. However, I have found that the resistance to devitrification increases as the ratio increases and, when the ratio exceeds about 1.4, satisfactory tubing can be produced. Therefore it will be apparent that my new glasses not only possess a higher ultra-violet transmission than prior black phosphate glasses, but the scope of their usefulness is increased by their resistance to devitrification and their higher stability to acid and water.

The following compositions in terms of percent by weight as calculated from their respective batches will further illustrate my invention.

|  | I | II | III | IV | V | VI | VII | VIII |
|---|---|---|---|---|---|---|---|---|
| $P_2O_5$ | 62 | 67 | 71 | 67 | 67 | 67 | 67 | 70 |
| CaO | 19 | 16 | 16 | 8.2 | 5.9 | 3.9 |  |  |
| BaO | 12 | 10 | 10 | 17.8 | 20.1 | 22.1 | 26 | 23 |
| $Al_2O_3$ | 4 | 4 |  | 4 | 4 | 4 | 4 | 4 |
| CoO | 2 | 2 | 2 | 2 | 2 | 2 | 2 | 2 |
| NiO | 1 | 1 | 1 | 1 | 1 | 1 | 1 | 1 |
| Per cent trans @ 254 m$\mu$ | 33 | 49 | 63 | 65 | 70 | 63 | 51 | 41 |
| Mol per cent ratio $P_2O_5$/RO | 1.05 | 1.34 | 1.42 | 1.80 | 2.00 | 2.20 | 2.78 | 3.28 |

With the exception of glass III, the above compositions correspond to some of the glasses represented in curve A. They were made from pure materials and were melted reducingly by the inclusion of 1% of sugar in their batches. Glass I illustrates the low transmission which is obtained when the molecular percentage ratio $P_2O_5$/RO is 1. Glass I devitrifies too easily to make satisfactory tubing. It will be seen that the transmission rises as the ratio is increased to about 2.0 for glass V, but diminishes thereafter. As an aid to stability alumina was included in these glasses with the exception of glass III from which it was omitted. The presence of minor amounts of other constituents which do not cause ultra-violet absorption is not objectionable, but too large amounts of such extra constituents may lower the stability. Of the above examples, glasses II to VII are particularly suitable for my purposes because they have transmissions of about 50% or better and have good stability against devitrification. My researches have shown that black phosphate glasses containing cobalt oxide alone have characteristics similar to those of the above recited glasses which contain cobalt and nickel oxides. Such glasses containing cobalt oxide alone are therefore included within the scope of my invention as claimed.

What I claim is:

1. A black phosphate glass which comprises essentially $P_2O_5$ and at least one second group oxide, and which contains cobalt oxide, the molecular percentage ratio $P_2O_5$/RO being between 1.3 and 2.8, where RO is the total of second group oxides, the glass in a thickness of one millimeter having a transmission of at least 50% at wave length 254 m$\mu$ and substantially complete absorption of visible light.

2. A black phosphate glass which comprises essentially $P_2O_5$ and at least one second group oxide, and which contains cobalt and nickel oxides, the molecular percentage ratio $P_2O_5$/RO being between 1.3 and 2.8, where RO is the total of second group oxides, the glass in a thickness of one millimeter having a transmission of at least 50% at wave length 254 m$\mu$ and substantially complete absorption of visible light.

3. A black phosphate glass which comprises essentially $P_2O_5$ and at least one alkaline earth oxide, and which contains cobalt and nickel oxides, the molecular percentage ratio $P_2O_5$/RO being between 1.3 and 2.8, where RO is the total of second group oxides, the glass in a thickness of one millimeter having a transmission of at least 50% at wave length 254 m$\mu$ and substantially complete absorption of visible light.

4. A black phosphate glass which comprises essentially $P_2O_5$ and at least one alkaline earth oxide, and which contains cobalt and nickel oxides, the molecular percentage ratio $P_2O_5$/RO being greater than 1.4, where RO is the total of second group oxides, the glass in a thickness of one millimeter having a transmission of at least 50% for ultra-violet radiations of wave length 254 m$\mu$ and substantially complete absorption of visible light.

5. A black phosphate glass which comprises essentially $P_2O_5$ and at least one second group oxide and alumina, and which contains cobalt oxide, the molecular percentage ratio $P_2O_5$/RO being between 1.3 and 2.8, where RO is the total of second group oxides, the glass in a thickness of one millimeter having a transmission of at least 50% at wave length 254 m$\mu$ and substantially complete absorption of visible light.

6. A black phosphate glass which comprises essentially $P_2O_5$ and at least one alkaline earth oxide and alumina, and which contains cobalt and nickel oxides, the molecular percentage ratio $P_2O_5$/RO being between 1.3 and 2.8, where RO is the total of second group oxides, the glass in a thickness of one millimeter having a transmission of at least 50% for ultra-violet radiations of wave length 254 m$\mu$, and substantially complete absorption of visible light.

7. A black phosphate glass which comprises essentially $P_2O_5$ and at least one alkaline earth oxide, and which contains cobalt and nickel oxides, the molecular percentage ratio $P_2O_5$/RO being about 2, where RO is the total of second group oxides, the glass in a thickness of one millimeter having a transmission of at least 50% at wave length 254 m$\mu$ and substantially complete absorption of visible light.

8. A glass having the approximate composition 67% $P_2O_5$ 6% CaO, 20% BaO, 4% $Al_2O_3$, 2% CoO, and 1% NiO, and having in one millimeter thickness a transmission of at least 50% at wave length 254 m$\mu$.

JOSEPH G. HOOLEY.